United States Patent [19]
Miller

[11] Patent Number: 4,701,040
[45] Date of Patent: Oct. 20, 1987

[54] IDENTIFICATION CARD CAMERA SYSTEM HAVING IMPROVED CARD CLASSIFYING APPARATUS

[75] Inventor: Douglas E. Miller, Oakdale, Mass.

[73] Assignee: Polaroid Corporation, Cambridge, Mass.

[21] Appl. No.: 869,183

[22] Filed: May 30, 1986

[51] Int. Cl.⁴ .............................................. G03B 17/24
[52] U.S. Cl. .................................................... 354/109
[58] Field of Search .................. 355/40 FP; 354/105, 354/106, 109

[56] References Cited

U.S. PATENT DOCUMENTS

| | | | |
|---|---|---|---|
| 2,051,193 | 8/1936 | Wittel | 354/109 |
| 3,371,587 | 3/1968 | Galletta | 354/109 |
| 3,631,773 | 1/1972 | Moodie | 95/1.1 |
| 3,641,886 | 2/1972 | Seiden | 95/1.1 |
| 3,678,818 | 7/1972 | Moodie | 95/1.1 |
| 3,683,764 | 8/1972 | Johnson | 95/1.1 |
| 3,696,716 | 10/1972 | Pasieka | 95/1.1 |
| 3,726,198 | 4/1973 | Bjork et al. | 95/37 |
| 3,762,292 | 10/1973 | Bjork et al. | 95/36 |
| 3,775,007 | 11/1973 | Davidson | 354/105 X |
| 4,248,510 | 2/1981 | Baker | 354/109 |
| 4,540,259 | 9/1985 | Blakely et al. | 354/109 |

FOREIGN PATENT DOCUMENTS 287411 6/1931 Italy ..................................... 354/105

Primary Examiner—Donald A. Griffin
Attorney, Agent, or Firm—Leslie J. Payne

[57] ABSTRACT

This disclosure relates to an improved identification card camera system having an apparatus for use in classifying different kinds of identification cards. Such apparatus includes a marker assembly which is actuatable so that individual classifying markers can be selectively positioned adjacent data cards which are used in production of the identification cards.

9 Claims, 11 Drawing Figures

IDENTIFICATION CARD CAMERA SYSTEM HAVING IMPROVED CARD CLASSIFYING APPARATUS

BACKGROUND OF THE INVENTION

This invention relates, generally, to an apparatus which facilitates classification of documents. More specifically, it is directed to an apparatus for use in conjunction with a photographic identification card camera system for purposes of classifying different types of identification cards to be produced.

Camera systems for providing identification cards, such as automobile driving licenses, containing a photograph of a subject to whom the card applies and other related printed or graphic data are well known in the art. Systems which are and have been used by numerous private and governmental organizations are described generally in U.S. Pat. Nos. 3,631,773; 3,641,886; 3,678,818; 3,683,764; 3,696,716; 3,726,198; 3,762,292; 4,248,510; and 4,540,259.

The present invention relates to an improvement of the identification card camera system described in the last noted patent. While the camera system described therein functions quite satisfactorily, nevertheless there have been problems associated with operator mishandling thereof. For example, some states issue driver licenses which are color coded for classification purposes. Thus, it is necessary that the camera system operator be able to easily, quickly and reliably distinguish these different classifications. To provide each license with the appropriate color coding, a camera operator in such a system manually places an appropriately color coded card adjacent a data card bearing the information which is utilized in producing the license. These color coded cards are stored outside the camera. Unfortunately, the color coded cards often become lost, misplaced or damaged. On other occasions the operator inadvertently mispositions them within the camera system, thereby resulting in blockage of information appearing on the data card. It is evident that there is need for a simple, yet reliable apparatus for use in an identification camera capable of repeatedly distinguishing different licenses with appropriate color coding.

It is clear, therefore, that certain known camera identification systems are subject to disadvantages and shortcomings regarding the efficient and reliable classification of identification cards to be provided thereby.

SUMMARY OF THE INVENTION

It is an object of the present invention to provide an improved identification card camera having means for selectively identifying different categories of identification documents. Towards this end, such means includes a plurality of markers movable to an operative condition adjacent a data document used in the production of the identification document. Provision is made for means which can selectively position each of the markers to the operative condition.

In an illustrated embodiment, the markers are attached at peripherally spaced locations to a rotatable actuator assembly. An indexing arrangement is provided and is operable so that each marker can be selectively indexed to the desired area. Hence, individual markers can be correctly, reliably and easily positioned.

It is, therefore, an object of the present invention to provide an improved photographic apparatus which facilitates simple and reliable classification of identification cards; a photographic apparatus of the foregoing type which has an apparatus having different markers to be presented at a desired area with each marker representing a different classification; and, an apparatus of the last-noted type which allows reliable indexing of each marker to the desired area.

The above and other objects and further scope of applicability of this invention will become apparent when reading the following detailed description in conjunction with the accompanying drawings wherein like structure is represented by like reference numerals throughout the several views.

DETAILED DESCRIPTION

Components of an identification card camera system 10 of the present invention are shown in FIGS. 1–11.

Figure 1:
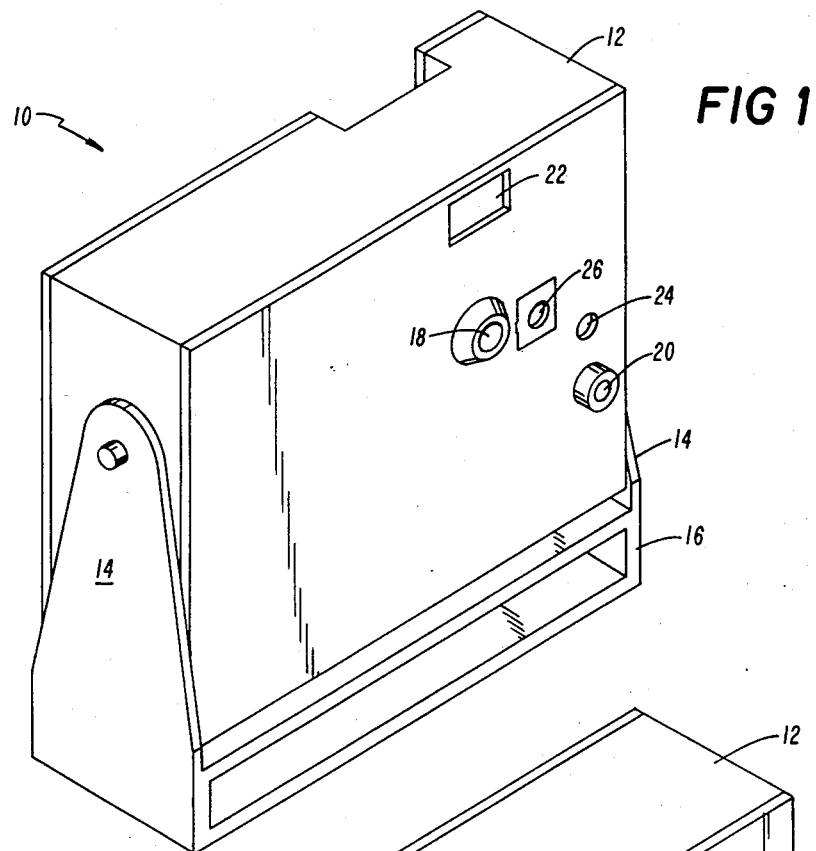
FIG. 1 is a perspective view of the front of a camera system embodying the present invention.

Included in the camera system 10 is a parallelpiped housing or assembly 12 which is supported pivotally from supports 14 vertically extending from a pedestal 16. Located at the camera front, as seen in FIG. 1, is an ID camera objective lens 18, a record camera objective lens 20, a subject illuminating strobe lamp 22, a strobe quenching photocell 24 and a subject aiming light 26. It is understood that the camera system 10 takes two photographs of the subject; one on an ID camera and the other on a record film strip.

Figure 2:
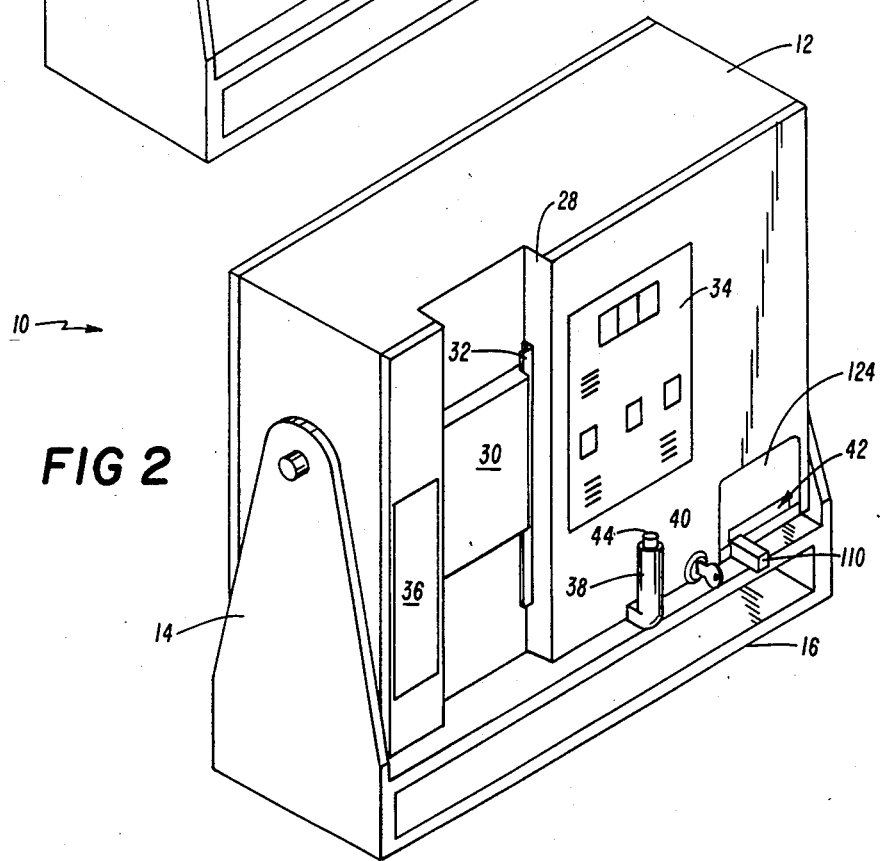
FIG. 2 is a perspective view of the rear of the camera system shown in FIG. 1.
Figure 10:
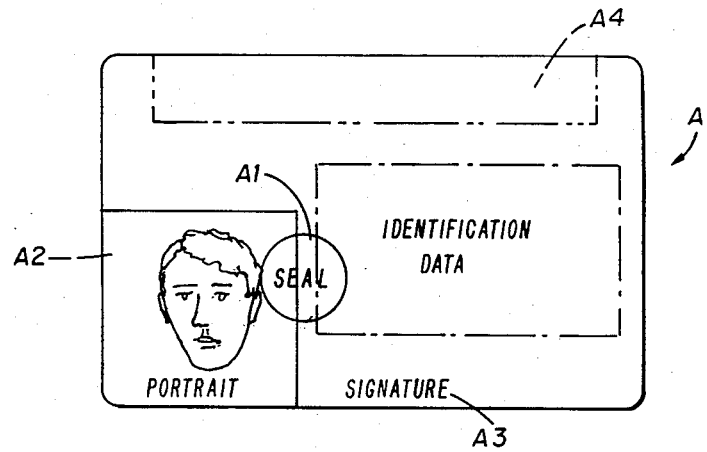
FIG. 10 is a view of an identification card made in accordance with the present invention; and, FIG. 11 is a fragmentary perspective view of another embodiment of a component of the marker assembly of the present invention.

Reference is now made to FIG. 2 for showing a rear wall of the camera housing 12. Located at the rear wall of the camera housing 12 is a channel-shaped access 28 for slidably receiving a self-developing camera back 30 mounted on ways 32. The camera back 30 is adapted to be moved vertically between upper and lower positions relative to an objective axis of the ID camera objective lens 18. The camera back 30 receives a film pack (not shown) of the kind receiving self-developing film units, also not shown. The film units are of a size so as to provide two identification cards. Movement of the camera back 30 to the upper or lower position determines which half of each film unit is to record the identification card. It should be understood that each film unit is withdrawn from the camera back 30 following processing of two identification documents or cards, such as, drivers licenses (FIG. 10).

Also positioned on the back wall of the housing 12 is an indicator lamp bezel 34, a record filmstrip door 36, an aiming handle 38, an initialization keylock 40, and an improved marker assembly or means 42. The function of the marker assembly 42 will be described in greater detail below.

The aiming handle 38 carries at its upper end a pushbutton 44 for actuation of the strobe lamp 22 and shutters (not shown) associated with the respective objective lenses 18 and 20. Of course, the shutters control exposure of each film unit in the film pack and the record film strip.

Figure 3:
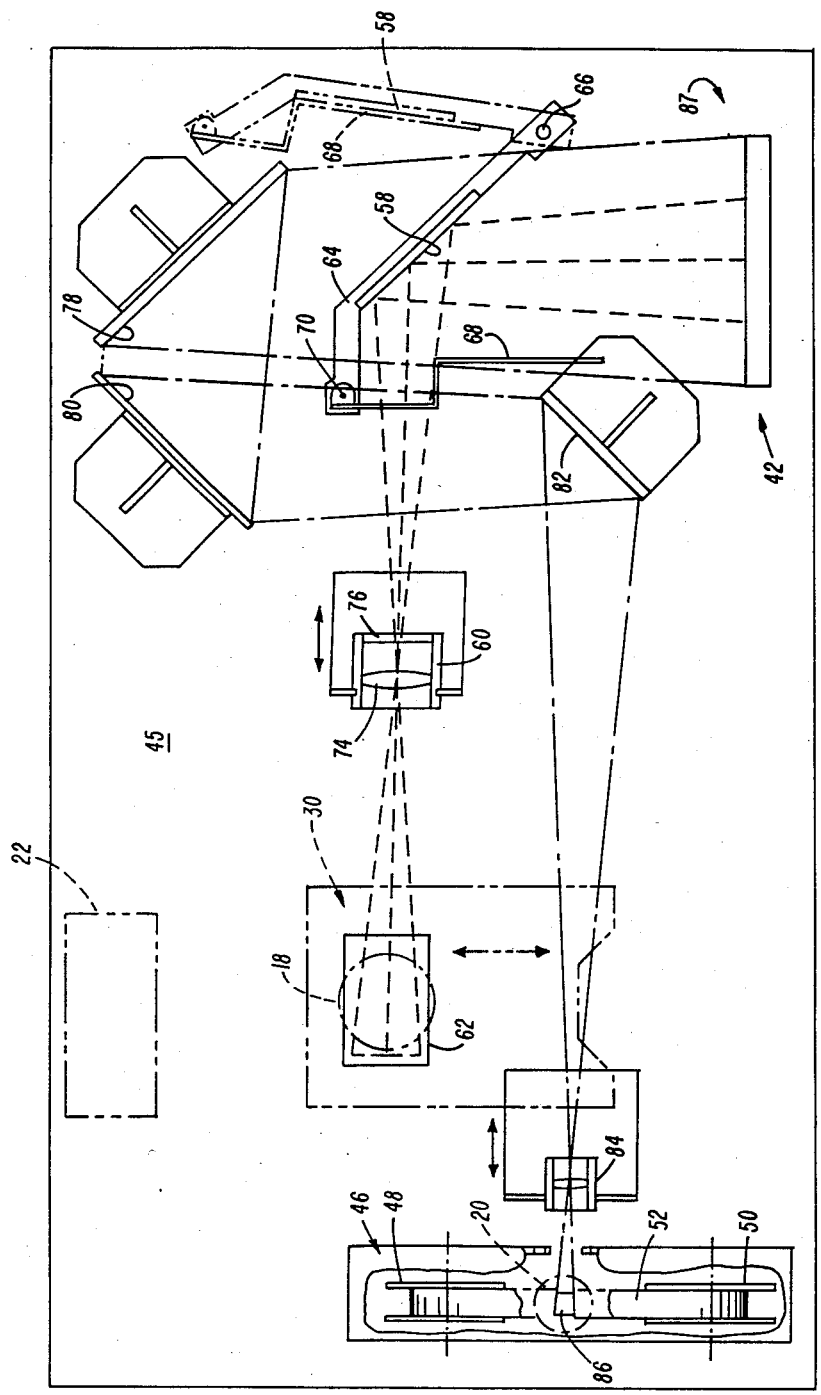
FIG. 3 is a rear elevational view illustrating components of the system supported by a chassis plate contained within the housing illustrated in FIGS. 1 and 2.

FIG. 3 is an elevational view showing components of the camera system 10 as seen from the rear of a front chassis plate 45 of the camera housing 12. The relative positions of the objective lenses 18 and 20, the strobe lamp 22 and the ID camera back 30 are depicted in outline by phantom lines. A recording camera 46 is supported from the chassis plate 45 behind the objective lens 20. As shown, it includes supply and take-up spools 48 and 50, respectively, for feeding a record film strip 52 incrementally in frame-by-frame fashion passed the optical axis of the lens 20. The record film strip 52 is preferably 16 mm film and may be of a type conventionally employed in motion picture cameras.

Optical components supported from the front plate 45 direct light from the upper surface of the marker assembly 42 to the film planes of the camera back 30 and recording camera 46. A first moveable mirror 58, an ID imaging lens unit 60, and a second moveable mirror 62 are positioned between the film plane of the ID camera back 30 and the objective lens 18.

As shown in FIG. 3, the first moveable mirror 58 is mounted on a bracket 64 pivotally supported at a pintel 66 secured in the front plate 45. The bracket 64 is movable between an operative position, as shown in solid lines and an inoperative displaced position depicted in phantom lines. The bracket 64 extends forwardly of the mirror 58 at its upper end to support a shade or mask 68. The shade 68 depends freely from a pivotal support 70 on the bracket 64 and assumes the position shown in solid lines under the influence of gravity. When the bracket 64 is moved to its displaced or inoperative position, as represented by the phantom lines, the shade 68 will overlie the mirror 58 to inhibit reflection of stray light.

The lens unit 60 supports an imaging lens 74 and a polarized filter 76. In light of the organization of mirrors 58 and 62 together with the lens unit 60, light reflected from the top of the marker assembly 42 will proceed along the dashed lines to the film plane of the ID camera back 30. Also an image of the top of the marker assembly 42 is presented to the film plane (not shown) of the record camera 46 by an optical path including first, second and third fixed mirrors 78, 80 and 82 respectively. The optical path between the top of the marker assembly 42 and the film plane of the recording camera 46 further includes a data imaging record lens unit 84 supported on the front chassis plate 45. The image formed by the lens unit 84 is presented to the recording camera film plane by a third movable mirror 86 which is supported between the lens 20 and the recording camera film plane.

Reference is made to the last-noted patent for purposes of even better understanding the structural and operational aspects of the camera system 10, which do not directly relate to the improvement of the present invention. While the improvement of the present invention is embodied in the camera system described in said patent, the principles and scope of this invention apply to other cameras as well, wherein classification of recordable material is desired.

Figure 4:
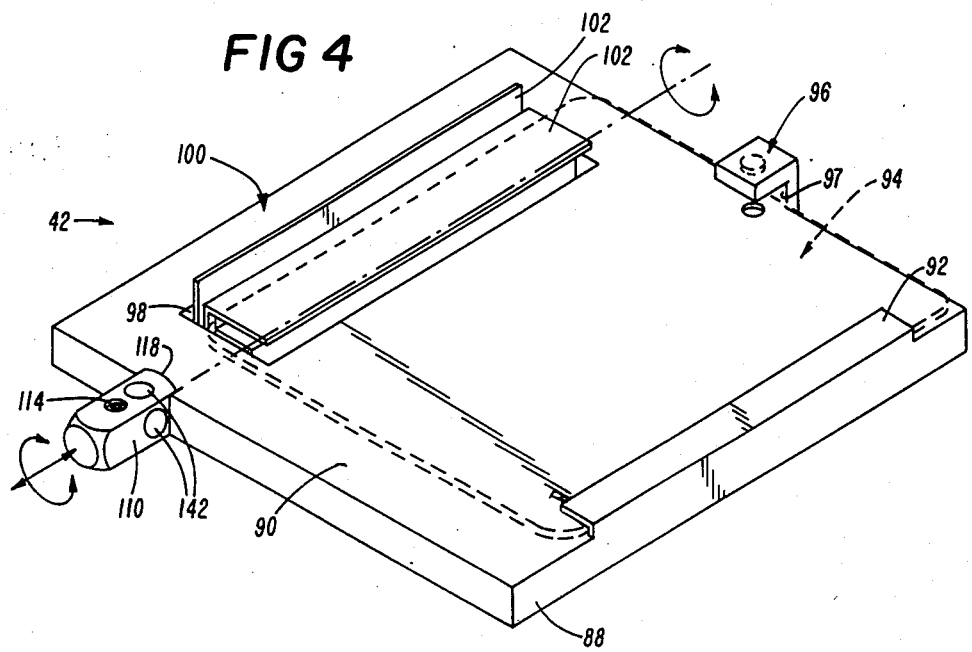
FIG. 4 is a perspective view of an improved marker assembly of the present invention.

Reference is now made to FIG. 4 and the marker assembly 42 which is located in a compartment 87 at the rear of the housing 12. The marker assembly 42 includes a molded plastic stationary supporting base 88 generally flush with the rear wall of the housing 12 and includes a planar card supporting surface 90.

The marker assembly 42 is formed with an elongated card retaining lip 92. The lip 92 serves to guide and retain one edge of a data card 94 placed on the planar surface 90.

A data card sensing switch assembly 96 of the optical type is shown located adjacent the inwardmost side of the supporting base 88. The optical switch assembly 96 functions to detect the presence or absence of the data card 94 in the noted correct position. Should the former condition be satisfied the camera system 10 functions in the manner intended. Absence of the data card 94 in the desired position prevents further photographic operations. The switch assembly 96 includes a stop surface 97 against which the data card 94 abuts so as to insure proper positioning of the data card. The supporting base 88 includes an indexable marker wheel assembly 100. As will be explained, the marker wheel assembly 100 facilitates color coding of drivers licenses and indication of different driver classifications.

The marker wheel assembly 100 includes a plurality of different colored markers or plates 102. Each marker 102 has a different color corresponding to a classification scheme useful for classifying the different types of drivers licenses. Although this embodiment discloses use of color coded markers, it will be appreciated that other indicia can be used on the markers. Each of the markers 102 is fixedly attached to a central carrier assembly 104 at peripherally spaced locations. The carrier assembly 104 is press fit onto a rotating rod or actuating shaft 106 which is mounted for rotation within the supporting base 88 such that the markers 102 are selectively rotatable within the recess 98 to their desired position or condition adjacent the data card 94. One end of the shaft 106 fits within a bore 108 of actuating handle 110, while the other end is within the carrier assembly 104. A slot 112 is arranged to cooperate with a threaded keeper 114. The threaded portion of the keeper 114 cooperates with a threaded opening 116 formed in the handle 110, thereby keying or coupling the handle 110 to the shaft 106 so that rotational movement of the former can be imparted to the latter. The slot 112 permits axial movement of the handle 110 relative to the shaft 106. This allows the handle 110 to be pulled outwardly from the supporting base 88 by a distance sufficient to have it clear a recess 118 formed in one side of the base. The handle 110 is shaped to fit within the recess 118 and is suitably configured (e.g. square crossection) to prevent the handle from rotating within the recess. The extent of axial displacement of the handle 110 is determined by the cooperation between the slot 112 and keeper 114. In order to rotate the handle 110, it is pulled outwardly so that it clears the recess 118. As a consequence, the shaft 106 can be rotated so that the markers 102 carried can be suitably positioned. To retain a particular marker 102 in its desired position adjacent the data card 94, the handle 110 is allowed to reenter the recess 118.

Figure 6:
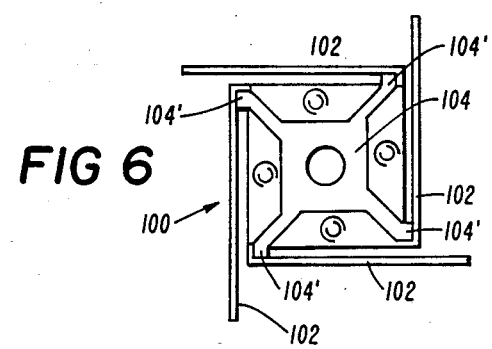
FIG. 6 is an end view of the component shown in FIG. 5.

Also, the markers 102 are mounted on the carrier 104 in such a manner as to be raised with respect to the surface 90. Towards this end, the carrier 104 has projections 104a extending along one edge of each peripheral surface thereof. The markers 102 have an L-shaped configuration with one leg portion covering one surface of the carrier 104 and the other portion fitted over one projection 104a and extending in overlying relationship to an adjacent marker 102 (FIG. 6). In this manner, each horizontally oriented marker 102 in conjunction with the lip 92 function to retain the data card 94 in the desired position.

The handle 110 is allowed to return automatically to the recess 118 in response to release of the pulling force. Return is achieved by a biasing means which in this embodiment is a compression spring 120 which surrounds one end portion of the shaft 106 and is functionally and structurally interposed between an internal bore shoulder of the handle 110 and a washer 122 which is seated in the handle and slidably mounted on the shaft 106. A pulling force on the handle 110 will result in compression of the spring 120 by the washer 122 when the keeper 114 contacts the end of the slot 112. Release of the pulling force allows the compressed spring 120 to return to its normal condition. As a result, the handle 110 is axially displaced inwardly such that it is able to fit within the recess 118. As a result, an indexable means is provided for selectively positioning the markers 102.

Figure 5:
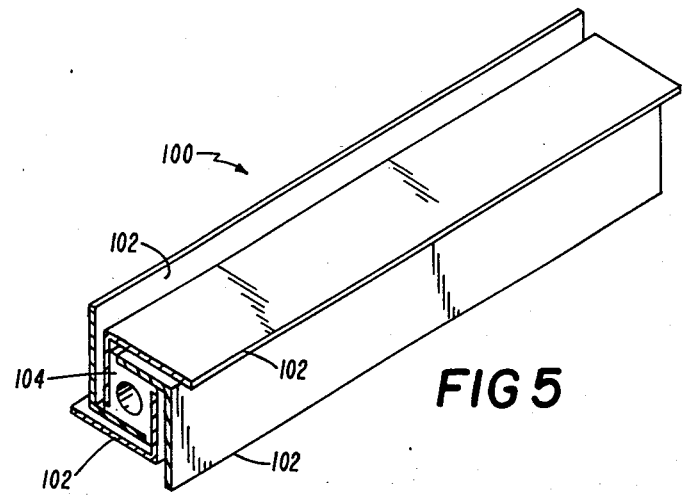
FIG. 5 is a perspective view, partly in section, of a component of the marker assembly depicted in FIG. 4.

The data card 94 is placed onto the planar card surface 90 so that it fits beneath lip 92 and one of the markers 102 (FIG. 5). The optical switch 96 senses the presence of the data card or carrier 94, thereby enabling the camera system 10 to complete its intended operations. The switch 96 interrelates with the camera system 10 in the same manner as the card sensing switch S3 described in the last-noted patent. To facilitate placement of the data card 94 in the desired position, provision is made for a pivoting door 124 attached to a bracket arrangement 126 which is in turn affixed to the rear of the housing assembly 12. As a result, the pivoting door 124 allows the operator to easily place the data card 94 adjacent the switch 96 and the marker assembly 100.

The door 124 is constructed to have pivoting movement to permit placement and withdrawal of the data card 94. A magnet 128 is placed on wedge-shaped mirror support 130. As the door 124 pivots upwardly about hinge 132 the magnet 128 contacts a magnetically permeable keeper 134. The keeper 134 limits inward pivoting movement of the door so as to prevent unwanted intrusion by an operator's hand. The keeper 134 also serves as a magnetic detent to retain the door 124 in an open condition. Another magnet 136 on the door 124 establishes a magnetic detent with a magnetically permeable stop member 138 to retain the door 124 in an upright and closed condition (see the solid line position). Also mounted on the bracket 126 is a microswitch 140 which when activated indicates that the door 124 is opened. Also the switch 140 when activated initiates a data recording portion of the identification card cycle carried out by the camera system 12. The switch 140 functions in the same manner as the S2 switch in the last noted patent. Since the switch 140 does not form an aspect of the present invention, a detailed description of its operation is not necessary. A mirror 142 is mounted on the support 130 and functions to augment the illumination of the data card 94 by an interior strobe light (not shown).

In accordance with the present invention, the operator can conveniently color code the identification document to be produced. It should be noted that the data card 94 includes the identification data and signature to be received on the final identification card A. Such data, referred to herein as "card data", will lie within the field of view of the ID camera back 30. In addition to the information to be received on the identification card, the data card preferably includes an area for "in-house data". Such data is not to be included on the identification card. Accordingly, this area lies outside the field of view of the ID camera back.

Instead of manually placing a color coded strip into the camera system 12, as is done in the system of the last noted patent, the operator will merely pull the handle 110 from the recess 118. Once the handle 110 is free of the recess 118, the operator can rotate it until a desired individual color indicia mark 142 on handle 100 is facing upwardly. Each color indicator 142 corresponds in color to the color of an associated marker 102. Thus, the operator can be sure that the correct marker 102 is being used. Thereafter, the handle 110 is released and, under the influence of the spring 122, returns to a seated position within the recess 118 whereby further rotation is prevented.

In placing the data card 94 onto the surface 90, the pivot door 124 is opened. When opened, it actuates microswitch 140. This initiates a portion of the identification card cycle to be carried out as explained in the last-noted patent. The data card 94 will be pushed to surface 97 so as to be properly located. Actuation of the optical switch 96 will be effective to cause recording of the data card 94 on the record film as described in the last-noted patent. Further details of the operation of the camera system 12 are not necessary because they do not form an aspect of the present invention.

Figure 8:
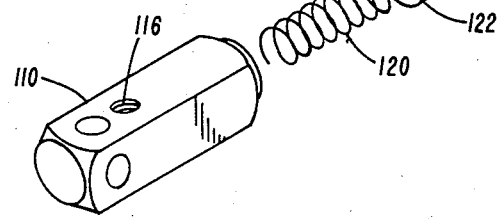
FIG. 8 is an exploded perspective view of some of the components included in the marker assembly.
Figure 8:
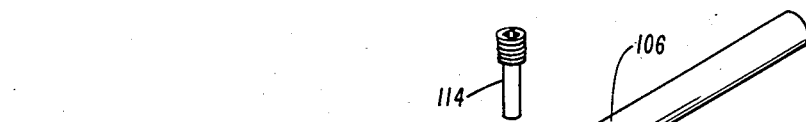
Figure 7:
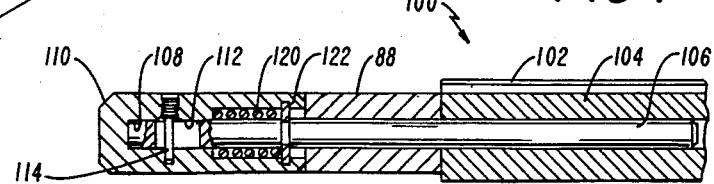
FIG. 7 is a cross-sectional view of a portion of the marker assembly depicted in FIG. 4.
Figure 9:
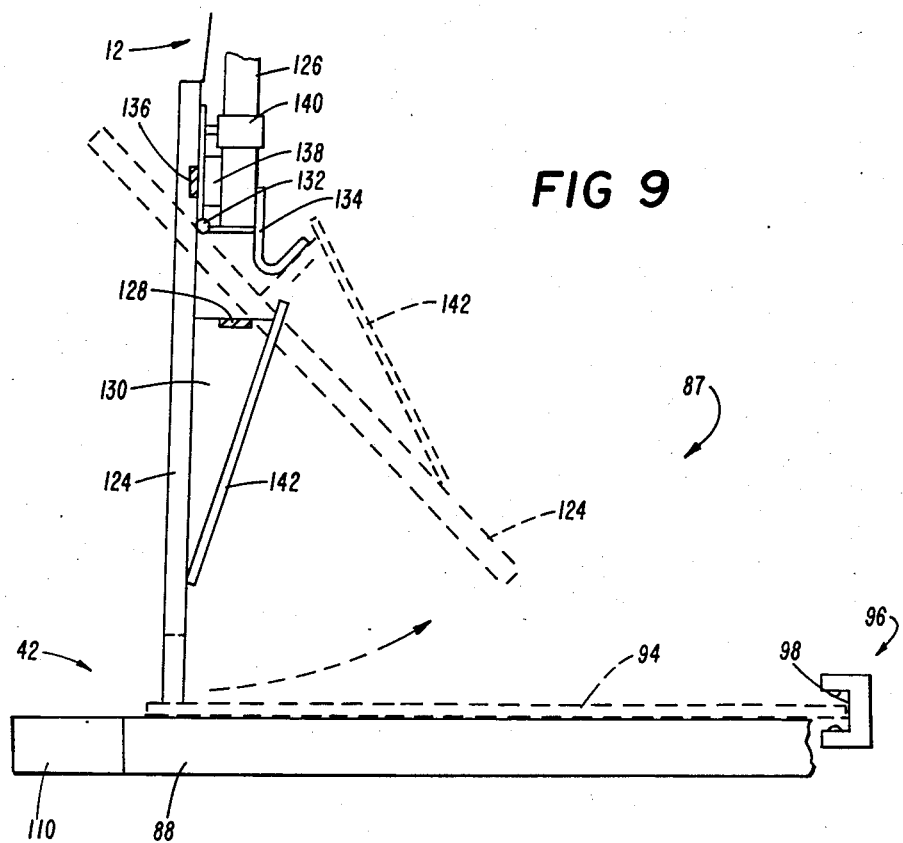
FIG. 9 is a schematic side view of an entry door associated with the marker assembly.

Reference is made to FIG. 8 for illustrating the final identification card A. Typically, it will include certain types of information: namely, (1) a designation, such as seal A1 to indicate the identification card issuing agency, such as the name of a state or state authority; (2) a portrait of the subject to whom the identification card applies, A2; (3) identification data applicable to the subject which may include a photograph of the applicant's signature, A3; and (4) a color code for classification purposes, A4.

Figure 11:
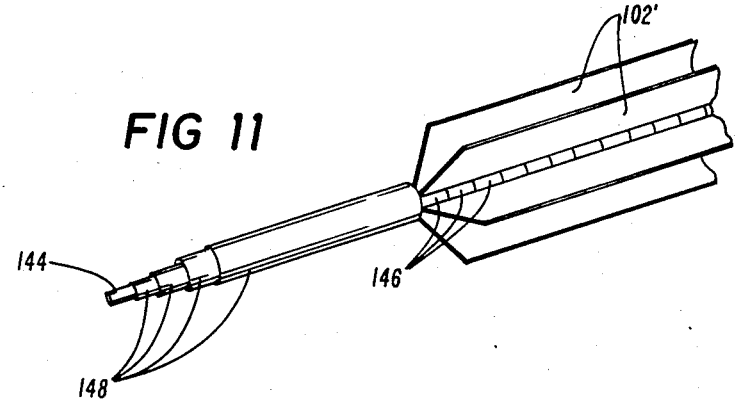

Reference is now made to FIG. 11 for illustrating another embodiment of the present invention. In this embodiment, each marker 102' is rotatably mounted on a common support shaft 144 by virtue of laterally extending tabs 146. The tabs 146 of each marker 102' are arranged to be adjacent tabs of other markers so as to not interfere with other tabs during rotation. Each marker 102' is integrally attached to respective hollow actuating shafts 148. For sake of compactness the shafts 148 are rotatably mounted in generally concentric relationship to one another and the support shaft 144. Thus, each actuating shaft 148 is capable of being independently rotated in response to appropriate manipulation by an operator. Although not shown in the illustrated embodiment, each actuating shaft 148 extends from the rear of the housing assembly 12 and is provided with a knob (not shown) for allowing rotation of such shafts. Furthermore, such knobs would be appropriately marked to indicate the color of the marker associated with the shaft.

Since certain changes may be made in the above described apparatus without departing from the scope of the invention herein involved, it is intended that all matter contained in the description or shown in the accompanying drawings shall be interpreted as illustrative and not in a limiting sense.

What is claimed is:

1. In a photographic identification camera for producing identification documents, said camera having a housing assembly defining a compartment which can removably receive therein a data document to be used for production of the identification document, the improvement comprising: means for selectively identifying different categories of identification documents, said means including a plurality of markers rotatably movable internally of the compartment to an operative condition which overlies a portion of the data document subsequent to its receipt within the compartment and each corresponding to a predetermined category of document so as to identify a different category of data document and, means operable for selectively positioning each of said markers to the operative condition so that respective ones of said markers can be recorded along with the data document.

2. The invention of claim 1 wherein said positioning means includes indexing means for allowing indexing of respective ones of said markers to the operative condition.

3. The invention of claim 2 wherein said positioning means includes a carrier assembly rotatable relative to said housing assembly, wherein each of said markers is attached to said carrier assembly at peripherally spaced locations such that each of said markers can be rotated to the operative condition.

4. In a photographic identification camera for producing identification documents, said camera having a housing assembly defining a compartment which can removably receive therein a data document to be used for production of the identification document, the improvement comprising: means for selectively identifying different categories of identification documents, said means including a plurality of markers movable to an operative condition adjacent the data document in the compartment and each corresponding to a predetermined category of document so as to identify a different category of data document and, means operable for selectively positioning each of said markers to the operative condition so that respective ones of said markers can be recorded along with the data document, wherein: said positioning means includes indexing means for allowing indexing of respective ones of said markers to the operatives condition; said positioning means includes a carrier assembly rotatable relative to said housing assembly, wherein each of said markers is attached to said carrier assembly at peripherally spaced locations such that each of said markers can be rotated to the operative condition; and said indexing means includes an actuating assembly rotatably connected to said carrier assembly and is axially displaceable relative thereto between first and second positions, wherein whenever said actuating assembly is in said first position said actuating assembly is prevented from rotation relative to said housing assembly, thereby preventing rotation of said carrier assembly, and whenever said actuating assembly is in said second position it is free to be rotated to thereby allow rotation of said carrrier assembly and positioning of selected ones of said markers to the operative condition.

5. The invention of claim 4 wherein said carrier assembly includes a rotatable rod, and said actuating assembly includes a handle keyed for rotation with said rod and being axially slidable on said rod between said first and second positions, and biasing means interposed between said handle and said rod for biasing said handle to said first position, whereby a pulling force must be exerted on said handle to move it to said second position.

6. The invention of claim 5 wherein said handle has individual indicia thereon, each of which corresponds to respective ones of said markers.

7. The invention of claim 6 wherein each of said markers is constructed such that at least a portion thereof serves to retain the data document in a desired position in said compartment.

8. The invention of claim 7 wherein said housing assembly includes a pivotal access door which communicates with said compartment to allow easy placement and withdrawal of the data document from said compartment.

9. In a photographic identification camera for producing identification documents, said camera having a housing assembly defining a compartment which can removably receive therein a data document to be used for production of the identification document, the improvement comprising: means for selectively identifying different categories of identification documents, said means including a plurality of markers movable to an operative condition adjacent the data document in the compartment and each corresponding to a predetermined category of document so as to identify a different category of data document and, means operable for selectively positioning each of said markers to the operative condition so that respective ones of said markers can be recorded along with the data document; said markers are rotatably coupled to a supporting shaft and said positioning means includes a plurality of rotatable actuating shafts each one of which is respectively connected to a separate one of said markers, said actuating shafts being rotatably mounted with respect to said supporting shaft and other ones of said actuating shafts, whereby each marker can be individually rotated relative to said other markers.

* * * * *